United States Patent [19]

Silbermann

[11] Patent Number: 5,619,912
[45] Date of Patent: Apr. 15, 1997

[54] PITTING KNIFE DRIVE ASSEMBLY WITH BOX CAM AND CHERRY PITTING APPARATUS INCLUDING SAME

[75] Inventor: Klaus Silbermann, Sunol, Calif.

[73] Assignee: Ashlock Company, a Division of Vistan Corporation, San Leandro, Calif.

[21] Appl. No.: 634,896

[22] Filed: Apr. 26, 1996

[51] Int. Cl.⁶ .............................. A23N 3/00; A23N 4/00; A23N 4/02; A23N 4/08

[52] U.S. Cl. ................. 99/559; 99/549; 99/556; 99/560; 99/565

[58] Field of Search ................. 99/490, 489, 547–566, 99/486

[56] References Cited

U.S. PATENT DOCUMENTS

| | | | |
|---|---|---|---|
| 3,731,615 | 5/1973 | Margaroli et al. | 99/559 |
| 3,817,168 | 6/1974 | Maytum | 99/490 |
| 3,910,416 | 10/1975 | Payne | 99/490 X |
| 3,915,082 | 10/1975 | Rejsa et al. | 99/552 |
| 3,965,809 | 6/1976 | Kieldsen et al. | 99/492 |
| 4,009,650 | 3/1977 | Lascelles et al. | 99/490 |
| 4,103,607 | 8/1978 | Hansen et al. | 99/548 |
| 4,313,373 | 2/1982 | Fehlmann | 99/549 |
| 4,485,732 | 12/1984 | Goudard | 99/565 X |
| 4,666,045 | 5/1987 | Gillespie et al. | 99/490 |
| 5,024,147 | 6/1991 | Petit et al. | 99/561 X |
| 5,074,203 | 12/1991 | Hirtle et al. | 99/544 |
| 5,329,843 | 7/1994 | Cheung | 99/556 X |
| 5,437,225 | 8/1995 | Hicks | 99/547 |

*Primary Examiner*—Timothy F. Simone
*Attorney, Agent, or Firm*—Limbach & Limbach L.L.P.

[57] ABSTRACT

A pitting knife drive assembly for mounting in a fruit pitting apparatus to drive pitting knives of the pitting apparatus. The pitting knife assembly includes a box cam, a drive assembly for rotating the box cam, a pivot unit which undergoes reciprocating pivoting motion in response to the rotating box cam, and a set of one or more shafts which reciprocate longitudinally in response to the reciprocating pivoting motion of the pivot unit. Preferably also, the pitting knife assembly includes a subassembly for causing the shafts to undergo reciprocating motion in directions perpendicular to their longitudinal axes. A preferred implementation of this subassembly includes a carriage driven by a rotating eccentric, where the eccentric and the box cam are mounted along a common drive shaft, and the drive assembly includes a motor for rotating the drive shaft. In other embodiments, the invention is an apparatus for pitting cherries which includes a pitting knife drive assembly having a box cam and pivot unit of the type described, a set of pitting knives attached to the drive assembly, and a conveyor subassembly for translating the fruit past the pitting knife assembly.

16 Claims, 9 Drawing Sheets

PITTING KNIFE DRIVE ASSEMBLY WITH BOX CAM AND CHERRY PITTING APPARATUS INCLUDING SAME

FIELD OF THE INVENTION

The invention is an apparatus for removing the pits from cherries or other articles of fruit. More particularly, the invention is an apparatus for seating articles (e.g., cherries) in holders and translating the holders past a set of pitting knives, including an knife driving assembly including a rotating box cam which causes the knives to execute reciprocating motion in which the knives move downward into engagement with the translating articles (to remove pits from the articles) and then upward away from the pitted translating articles.

BACKGROUND OF THE INVENTION

Figure 1:
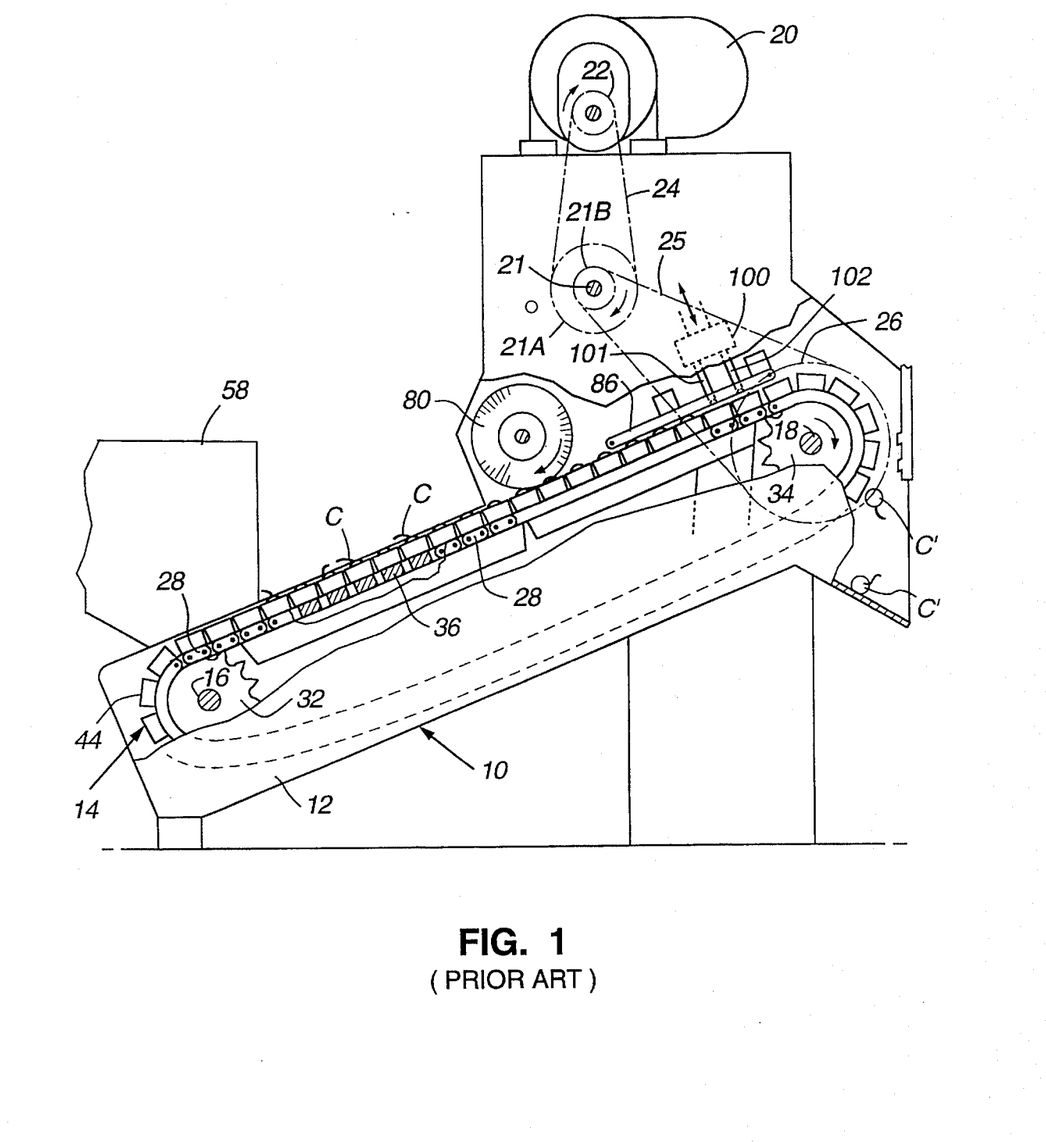
FIG. 1 is a side cross-sectional view of a conventional pitting apparatus.

One type of conventional cherry pitting apparatus is described in U.S. Pat. No. 3,731,615, issued May 8, 1973. FIG. 1 is a simplified side-cross-sectional view of such an apparatus. Pitting apparatus 10 of FIG. 1 includes frame 12, rotatable journals 16 and 18, sprocket 32 fixedly mounted to journal 16, sprocket 34 fixedly mounted to journal 18, and conveyor 14 looped around sprockets 32 and 34. The drive mechanism comprises motor 20, rotatable pulley 22, rotatable shaft 21, pulleys 21A and 21B fixedly attached to shaft 21, pulley 26 fixedly attached to journal 18, drive belt 24 looped around element 22 and pulley 21A, and drive belt 25 looped around pulleys 21B and 26. Motor 20 causes pulley 22 to rotate (clockwise as shown in FIG. 1), thus causing belt 24 to rotate shaft 21 clockwise and causing belt 25 to rotate pulley 26 clockwise. Rotating pulley 26 causes sprocket 34 to rotate conveyor 14 clockwise.

Conveyor 14 comprises two parallel endless chain loops 28 (each engaged with one of sprockets 32 and 34) and a set of plates 36. Each plate 36 is connected between the two chain loops 28. Only one of chain loops 28 is shown in FIG. 1, and the other is in a vertical plane parallel to the plane of FIG. 1. Fruit holders 44, which define pockets for receiving cherries (C), are fixedly attached to plates 36.

Cherries C (or other articles of fruit) fall from feed unit 58 onto holders 44, as the conveyor translates plates 36 past unit 58, so that a cherry C (or other article of fruit) is loaded into each of at east some of the pockets defined by holders 44. Preferably, water is sprayed on the cherries in the pockets to cause each cherry to float so that each cherry can easily be brushed into a preferred alignment by brush 80 as conveyor 14 translates each floating cherry past brush 80 (before the cherries reach alignment plate element 86).

Element 86 (fixedly mounted to frame 12) constrains movement of the aligned cherries which translate past it, thus retaining each cherry in the preferred alignment during the pitting operation.

As the aligned cherries translate past element 86 (i.e., past a "pitting station" of the FIG. 1 apparatus), reciprocating pitting knife assembly 100 engages the translating cherries to push out the pit from within each cherry. The pitted cherries (C') then fall out of the pockets after conveyor 14 translates the pitted cherries beyond the right end of element 86.

Pitting knife assembly 100 preferably includes two rows of pitting knives: a first row including pitting knife 101 shown in FIG. 1 (and other knives identical to knife 101), and a second row including pitting knife 102 shown in FIG. 1 (and other knives identical to knife 102). Knives 101 pit the cherries in one row of pockets while knives 102 simultaneously pit the cherries in another row of pockets. A conventional implementation of knife assembly 100 will be described with reference to FIGS. 2 and 3.

The knife assembly includes two shafts 4 which are fixedly mounted between vertically oriented plates 12A of frame 12. Plates 12A are mounted generally above element 86 (in the FIG. 1 apparatus). A portion of the knife assembly of FIGS. 2 and 3 hangs from shafts 4 (in a manner to be explained below).

The knife assembly also includes rotatably mounted drive shaft 21, which is rotated about its axis by a motor (e.g., motor 20 of FIG. 1). Cam 9 and eccentric 42 are fixedly mounted to shaft 21 (at different locations along the axis of shaft 21).

Eccentric 42 is attached at bearing 136 to eccentric shaft member 114, with eccentric 42 having freedom to rotate relative to member 114. As shaft 21 rotates about its longitudinal axis, eccentric 42 (which rotates as a unit with shaft 21) exerts force on member 114 which causes member 114 to undergo reciprocating motion as follows: the center of gravity of member 114 translates back and forth along an arc of a circle in the plane of FIG. 3, but member 114 does not rotate (about its center of gravity) in the plane of FIG. 3.

Figure 3:
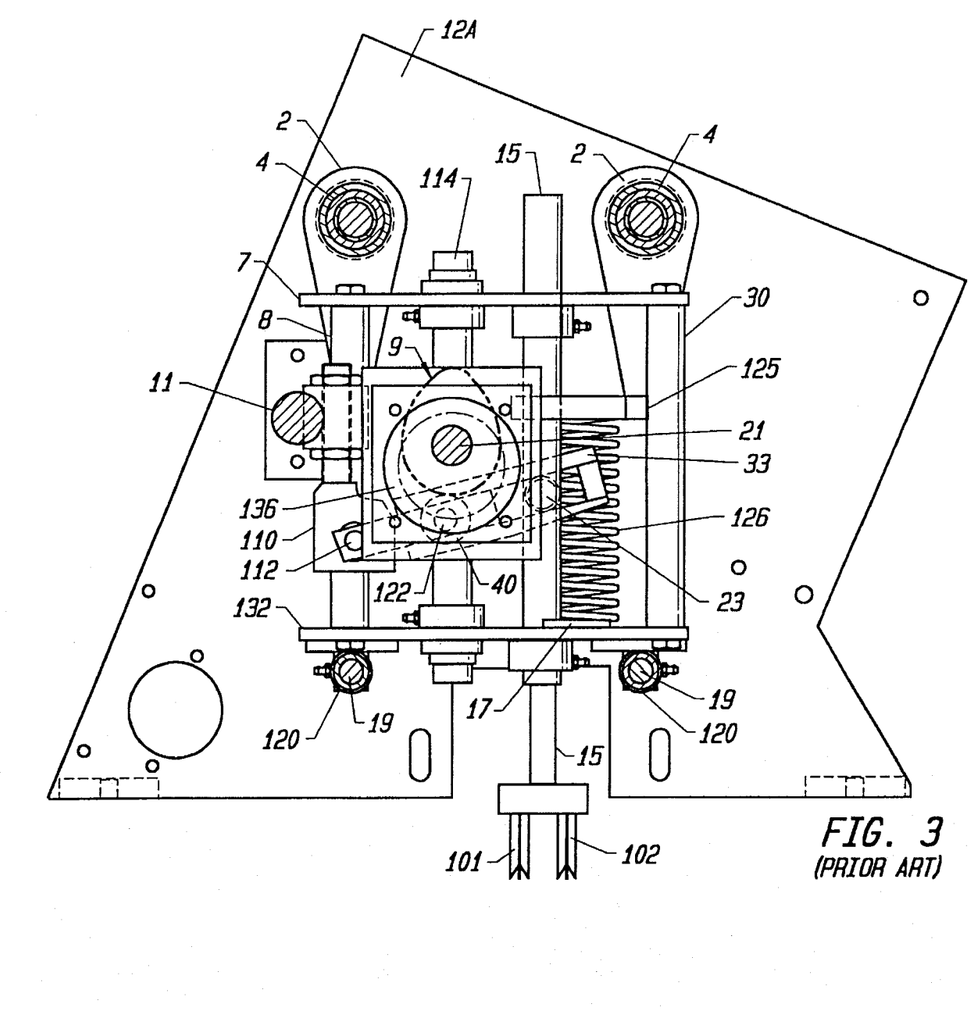
FIG. 3 is a cross-sectional view of the pitting knife assembly of FIG. 2, taken along line A—A of FIG. 2.

Member 114 is fixedly attached to a carriage comprising upper carriage plate 7, lower carriage plate 132, tie bar 30, and a pair of tie bars 8 (only one of bars 8 is shown in FIG. 3).

The carriage hangs from a pair of rotatably mounted swing arms 2. The upper end of each arm 2 is rotatably attached to one of parallel shafts 4. A pin 19 protrudes from the lower end of each arm 2 into a tube 120. Both tubes 120 are fixedly attached to lower carriage plate 132. Thus, as the carriage rocks back and forth (in response to rotation of eccentric 42), the carriage imparts this rocking motion to pins 19 of arms 2, thus causing arms 2 to swing back and forth on fixed shafts 4. More specifically, as the carriage rocks, pins 19 translate reciprocally as a unit with tubes 120. During the reciprocal translation of pins 19 together with tubes 120, each pin 19 rotates relative to the tube 120 which surrounds it (about the common axis of the pin and the surrounding tube).

Two parallel plunger shafts 15 extend through upper carriage plate 7 and lower carriage plate 132, each with freedom to translate in the direction of its longitudinal axis relative to the plates 7 and 132. A pitting knife assembly (including a first row of pitting knives 101 and a second row of pitting knives 102) is fixedly attached to the lower ends of shafts 15. Thus (assuming for the moment that shafts 15 are held fixed relative to the carriage), as the carriage (including plates 7 and 132) rocks back and forth, shafts 15 translate reciprocally as follows: the center of gravity of each shaft 15 translates back and forth along an arc of a circle in the plane of FIG. 3, but neither shaft 15 rotates (about its center of gravity) in the plane of FIG. 3.

However, the actual motion of shafts 15 (and the knives 101 and 102 fixedly attached thereto) is more complicated, because a mechanism (including cam 9 and rocker arm unit 33) provided to reciprocate shafts longitudinally relative to the carriage as the carriage rocks back and forth. The longitudinal motion of shafts 15 is timed relative to the swinging motion thereof (by the orientation of cam 9 relative to that of eccentric 42), so that the knives 101 and 102 undergo the following motion: knives 101 and 102 move longitudinally downward (into engagement with the cherries to be pitted) while the carriage swings in the direction of motion of the cherries (which corresponds to "toward the right" in FIG. 3), knives 101 and 102 then move longitudinally upward (until they are out of engagement with the cherries) while the carriage continues to swing in the direction of motion of the cherries, knives 101 and 102 then continue to move longitudinally upward while the carriage begins to swing in opposite direction (toward the left in FIG. 3), and finally knives 101 and 102 begin to move longitudinally downward (toward a new set of cherries to be pitted) while the carriage continues to swing in the direction opposite the direction of motion of the cherries.

We next describe the manner in which cam 9 and rocker arm unit 33 cause shafts 15 to execute longitudinally reciprocating motion. One end of rocker arm unit 33 (comprising pin 112 of unit 33) is pivotally attached to stroke adjustment screw 110. Screw 110 is adjustably attached to support bar 11, and bar 11 is fixedly attached to one of frame plates 12A. With screw 110 fastened in a selected position relative to bar 11, unit 33 is free to pivot reciprocally (both clockwise and counterclockwise in the plane of FIG. 3) about pin 112 in response to the forces alternately exerted thereon by rotating cam 9 and spring-loaded shafts 15. Before operating the apparatus, screw 110 can be repositioned relative to bar 11, in order to change the position of pin 112 and unit 33 (and thus shafts 15 engaged with unit 33) relative to the frame of the apparatus during operation. Two cam followers 40 are attached to unit 33 between the fixed end of unit 33 (the end attached to pin 112) and the free end of unit 33 (the right end in FIG. 3). A cam follower 23 protrudes from each of shafts 15 into engagement with unit 33 (near unit 33's free end), so that when unit 33 pivots clockwise in FIG. 3, unit 33 pulls cam followers 23 downward (and thus unit 33 pulls shafts 15 longitudinally downward). Shafts 15 are spring-loaded by compressing two identical springs 126 between carriage plate 132 and arm member 125 (member 125 is fixedly attached to each of shafts 15). The lower end of each spring 126 is held in position by a centering plug portion 17 of plate 132.

The outer surface (cam surface) of cam 9 engages cam followers 40. When the large radius portion of cam 9 (the portion of cam 9 having greatest radial thickness relative to the central longitudinal axis of shaft 21) rotates into engagement with cam followers 40, cam 9 pushes followers 40 down, thus pivoting the arm unit 33 clockwise about pin 112, which causes arm unit 33 to pull cam followers 23 downward, which in turn translates shafts 15 longitudinally downward relative to the carriage. As shafts 15 translate longitudinally downward relative to the carriage, spring centering arm 125 moves downward (with shafts 15) relative to the carriage, thereby compressing springs 126.

Then, when continuing rotation of shaft 21 rotates the small radius portion of cam 9 (the portion of cam 9 having less radial thickness than does the large radius portion) into engagement with cam followers 40, compressed springs 126 relax (their length increases), thus pushing arm 125 upward and causing shafts 15 to translate longitudinally upward relative to the carriage. As shafts 15 translate longitudinally upward relative to the carriage, cam followers 23 pivot arm unit 33 counterclockwise about pin 112. This pivoting motion of arm unit 33 pushes cam followers 40 upward so that cam followers 40 remain in contact with cam 9.

However, the conventional knife assembly described with reference to FIGS. 2 and 3 has several limitations and disadvantages, including the following:

the knife assembly must be spring-loaded (by compressing springs 126 between arm 125 and carriage plate 132), it must remain spring-loaded in operation (which increases power consumption, increases the cycle time of the periodic motion of shafts 15, and necessitates replacement of springs 126 from time to time as they wear out);

when motor 20 is turned off (after the knife assembly has been operating in response to rotation of shaft 21 by motor 20), springs 126 rapidly relax, thus driving shafts 15 longitudinally upward suddenly (this sudden action is potentially dangerous to workers in the vicinity of the apparatus, and increases wear and tear on the motor and other components of the apparatus, which in turn shortens the lifetime of the motor and the other components);

when motor 20 is turned off, springs 126 rapidly pull driving shafts 15 longitudinally upward and hold shafts 15 (and the pitting knives attached thereto) in their fully raised position (this is inconvenient since the operator or service technician will sometimes prefer that the knives remain in a lowered position when the motor is turned off); and the knife assembly's set up process is difficult in the sense that, not only must springs 126 be installed and compressed, but the proper relative orientation of cam 9 and eccentric 42 must be set to ensure that shafts 15 move longitudinally up and down in proper synchronization with the rocking motion of the carriage (typically two persons are needed to set up the apparatus).

It had not been known until the present invention how to design an apparatus for pitting cherries in a manner overcoming the disadvantages and limitations of the described conventional knife assembly.

SUMMARY OF THE INVENTION

In a class of preferred embodiments, the invention is a pitting knife drive assembly, which can be mounted in a fruit pitting apparatus to drive pitting knives of the pitting apparatus. The pitting knife assembly of the invention includes a box cam, means for rotating the box cam, a pivot unit which undergoes reciprocating pivoting motion in response to the rotating box cam, and a set of one or more shafts (to which pitting knives can be mounted) which reciprocate longitudinally (in directions parallel to their longitudinal axes) in response to the reciprocating pivoting motion of the pivot unit. Preferably also, the pitting knife assembly includes a subassembly for causing the shafts to undergo reciprocating motion in directions perpendicular to their longitudinal axes. A preferred implementation of the latter subassembly includes a carriage driven by a rotating eccentric, where the eccentric and the box cam are mounted along a common drive shaft, and the means for rotating the box cam include a motor for rotating the drive shaft (thereby rotating both the box cam and the eccentric).

In another class of embodiments, the invention is an apparatus for pitting fruit (e.g., cherries) which includes the described pitting knife drive assembly, pitting knives attached to the drive assembly, and a conveyor subassembly for translating the fruit past the pitting knife assembly.

DETAILED DESCRIPTION OF THE PREFERRED EMBODIMENTS

A preferred embodiment of the inventive pitting knife assembly will be described with reference to FIGS. 4–9. This embodiment is intended to replace a conventional knife assembly (e.g., the assembly described above with reference to FIGS. 2 and 3) in a pitting apparatus such as that described above with reference to FIG. 1.

Figure 2:
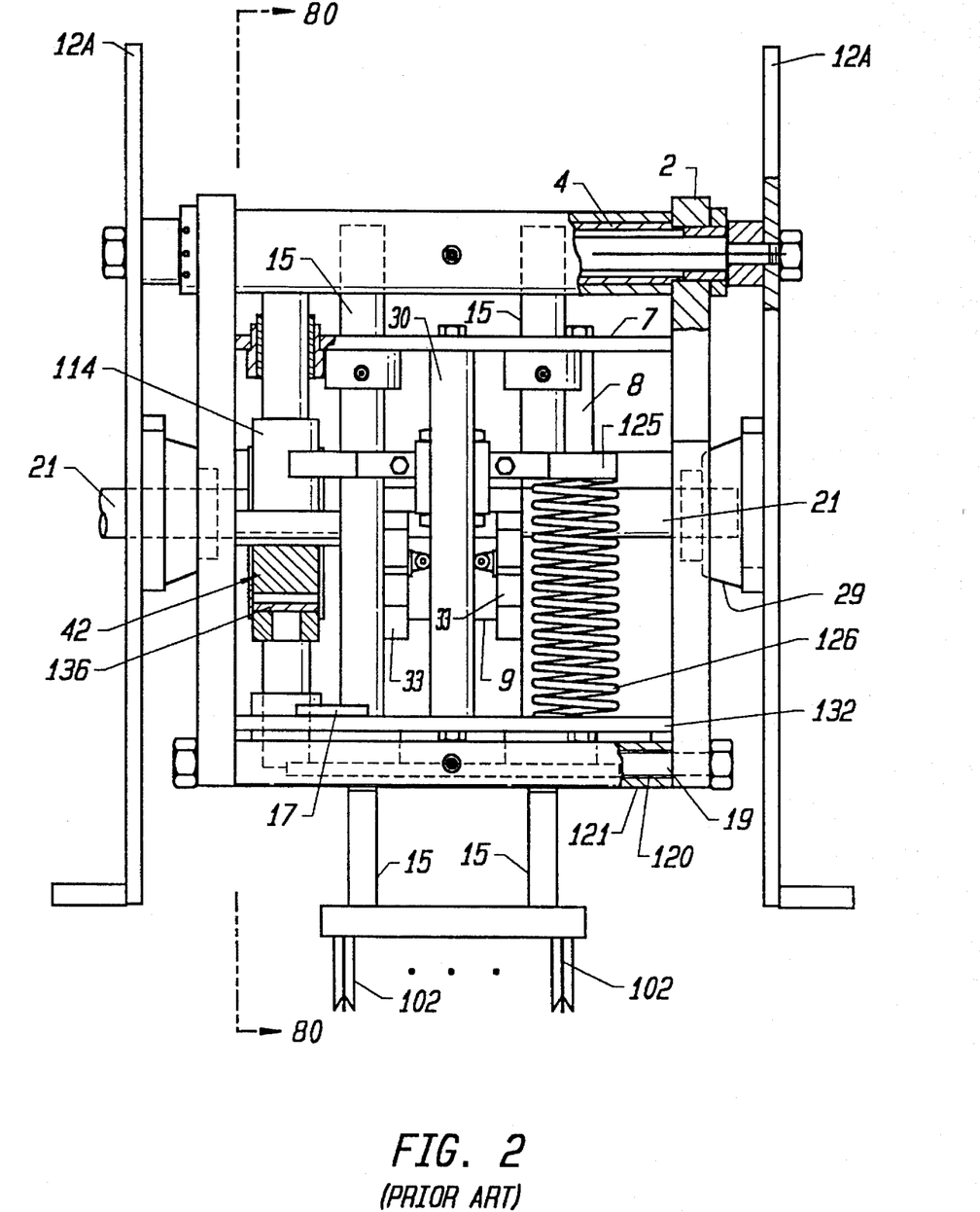
FIG. 2 is an elevational view (partially cut away) of a typical implementation of the pitting knife assembly of the FIG. 1 apparatus.
Figure 4:
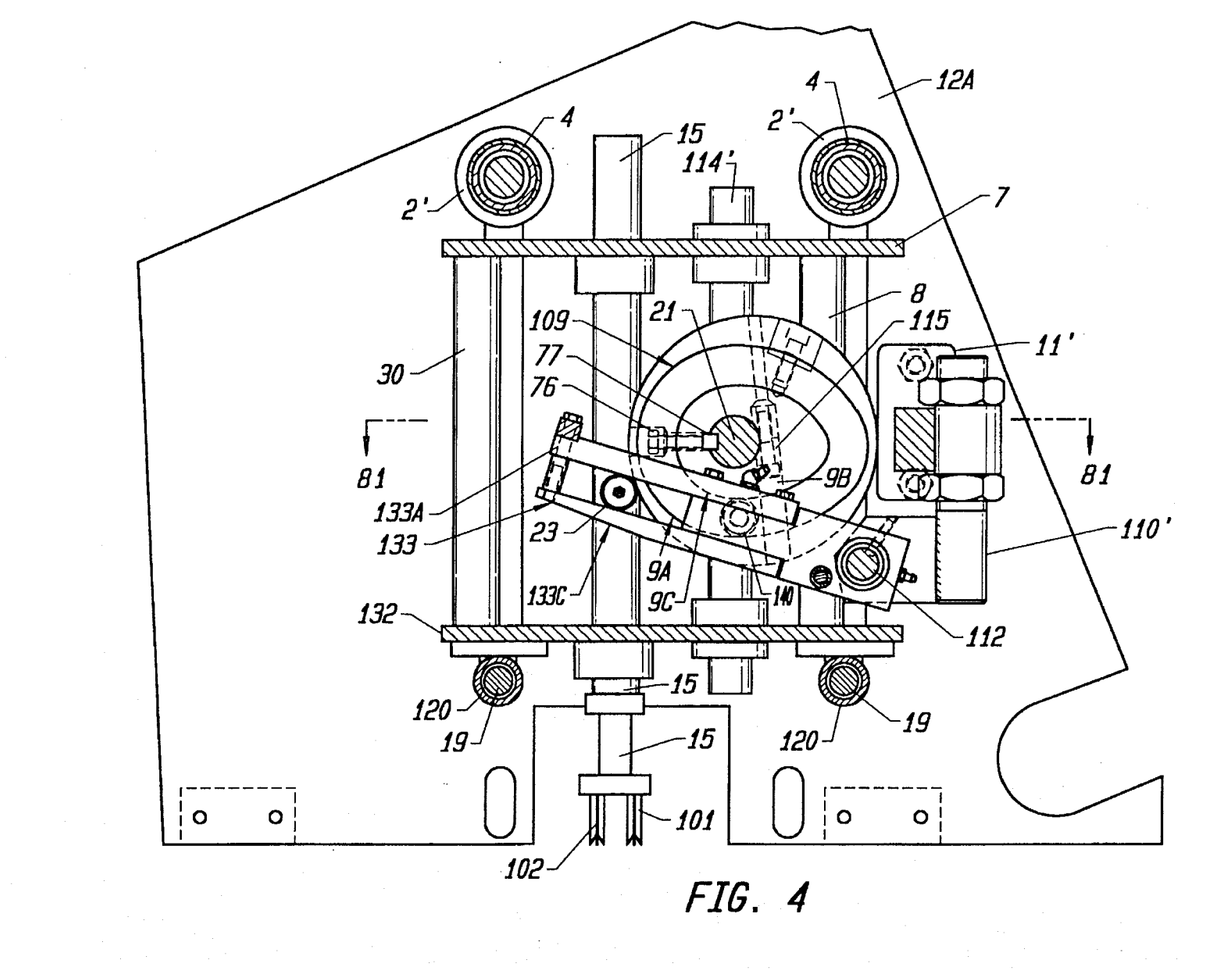
FIG. 4 is a cross-sectional view (in a vertical plane) of a preferred embodiment of a portion of the inventive pitting knife assembly (which can replace the FIG. 2 assembly in the FIG. 1 apparatus).

FIG. 4 is an elevational view of a preferred embodiment of a portion of the inventive pitting knife assembly (which assembly can replace the FIG. 2/3 assembly in the FIG. 1 apparatus). It will be recognized that FIG. 4 shows the left side of the inventive knife assembly while FIG. 3 shows the right side of a corresponding conventional assembly, and that FIG. 4 is roughly a mirror image of FIG. 3 (although there are important differences, to be explained below, between the apparatus shown in FIGS. 3 and 4). The main difference between the conventional FIG. 2/3 assembly and the inventive FIG. 4 assembly is that the FIG. 4 assembly employs box cam 109 to move a rocker arm assembly reciprocally (both up and down), rather than a conventional cam 9 (to move a rocker assembly down, during part of its cycle) and springs 126 (to move the rocker assembly up, during the remaining part of its cycle).

Figure 5:
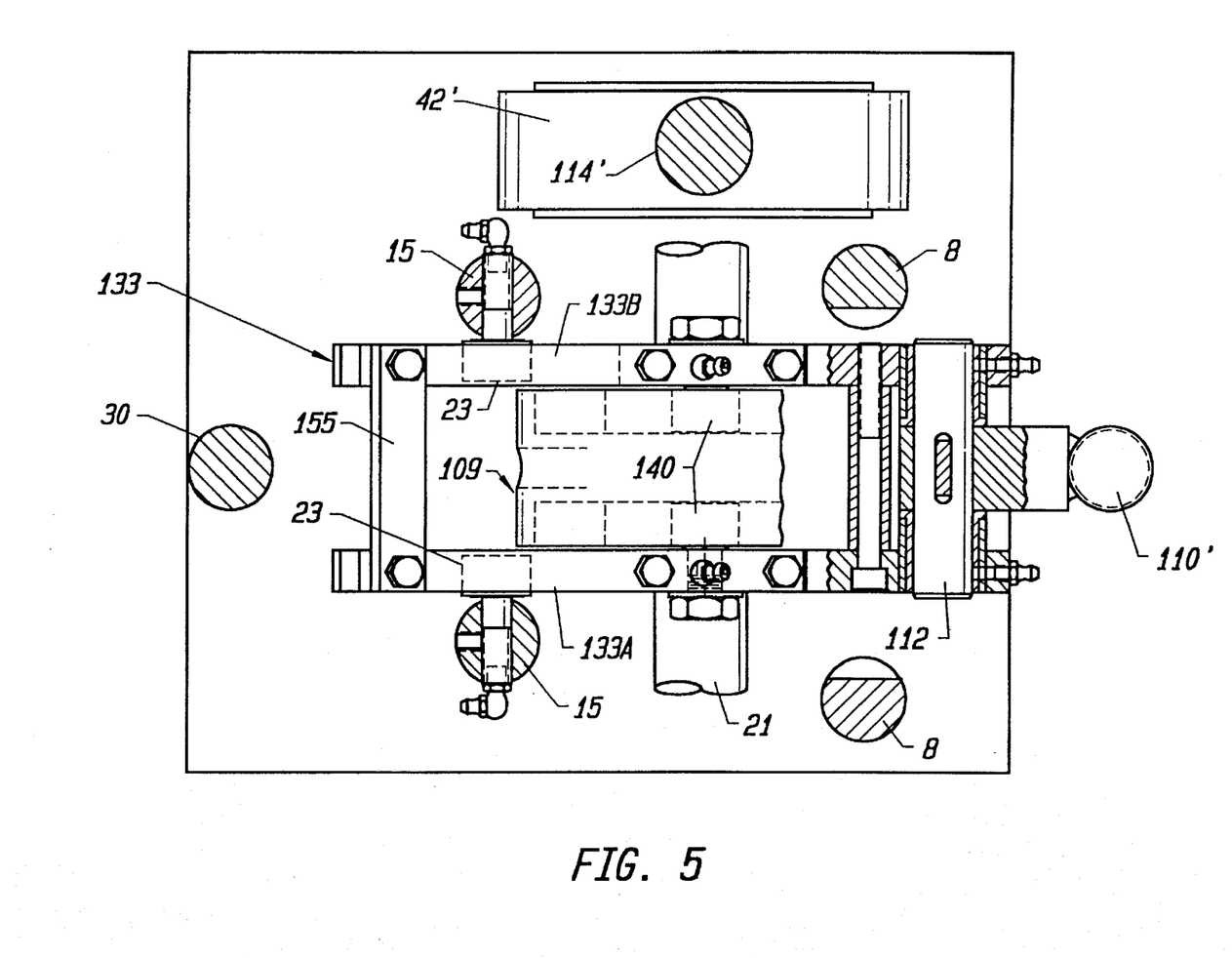
FIG. 5 is a cross-sectional view of a portion of the pitting knife assembly of FIG. 4, taken along line B—B of FIG. 4.

FIG. 5 is a cross-sectional view of part of the assembly of FIG. 4, taken along line B—B of FIG. 4. The FIG. 4/5 assembly includes several components which are identical to corresponding components in FIGS. 2 and 3, and which are identically numbered in FIGS. 2, 3, 4 and 5. These components have been described above, and their description will not be repeated below with reference to FIGS. 4 and 5

The following components of the FIG. 4/5 assembly differ from similar components of the FIG. 2/3 assembly: rocker arm unit 133 of FIGS. 4/5 has slightly different shape than rocker arm unit 33 of FIGS. 2/3; swing arms 2' of FIG. 4 have slightly different shape than swing arms 2 of FIGS. 2/3 (but arms 2' have the same function as arms 2); eccentric 42' of FIG. 5 has slightly different shape than eccentric 42 of FIGS. 2/3 (but eccentric 42' has the same function as eccentric 42); eccentric shaft member 114' of FIG. 5 has slightly different shape than eccentric shaft member 114' of FIGS. 2/3 (but member 114' has the same function as member 114); eccentric 42' of FIG. 5 is attached to member 114' at a bearing portion (not shown) of member 114'; lower carriage plate 132 of the carriage of FIGS. 4/5 does not have centering plug portions 17 of the type shown in FIGS. 2/3 (since the FIG. 4/5 assembly lacks springs 126); and stroke adjustment screw 110' and support bar 11' of FIGS. 4/5 have slightly different shapes than stroke adjustment screw 110 and support bar 11 of FIGS. 2/3 (but members 110' and 11' have the same function as members 110 and 11). Bar 11' is fixedly attached to frame plate 12A. Before operating the apparatus, screw 110' can be repositioned relative to bar 11' in order to change the position of pin 112 and unit 133 (and thus shafts 15 engaged with unit 133) relative to frame plate 12A (and the entire frame of the apparatus) during operation.

Box cam 109 will be described with reference to FIGS. 6 and 7, as well as FIGS. 4 and 5.

As shown in FIG. 4, box cam 109 is fixedly mounted to shaft 21 (at a different location along the axis of shaft 21 than the location at which eccentric 42' is fixedly mounted) using set screw 77 and clamp 115. To mount cam 109 to shaft 21, a first portion of clamp 115 is inserted in channel 278 in cam 109 (best shown in FIG. 6) and cam 109 is then positioned with respect to shaft 21 so that orifice 277 of cam 109 is aligned with a corresponding orifice (not shown) in shaft 21. The latter step is accomplished by inserting shaft 21 through channel 9B (channel 9B extends through cam 109 as best shown in FIG. 7). Then, set screw 77 is inserted through channel 276 in cam 109 (best shown in FIG. 6) into orifice 277 in cam 109 (best shown in FIG. 6), key 76 is then inserted through channel 276 into engagement with screw 77, and key 76 is rotated to advance screw 77 into the above-mentioned orifice in channel 21. Then, the second portion of clamp 115 is inserted through channel 278 into engagement with the first portion of clamp 115, and the second portion of clamp 115 is tightened against shaft 21 and the first portion of clamp 115.

Figure 6:
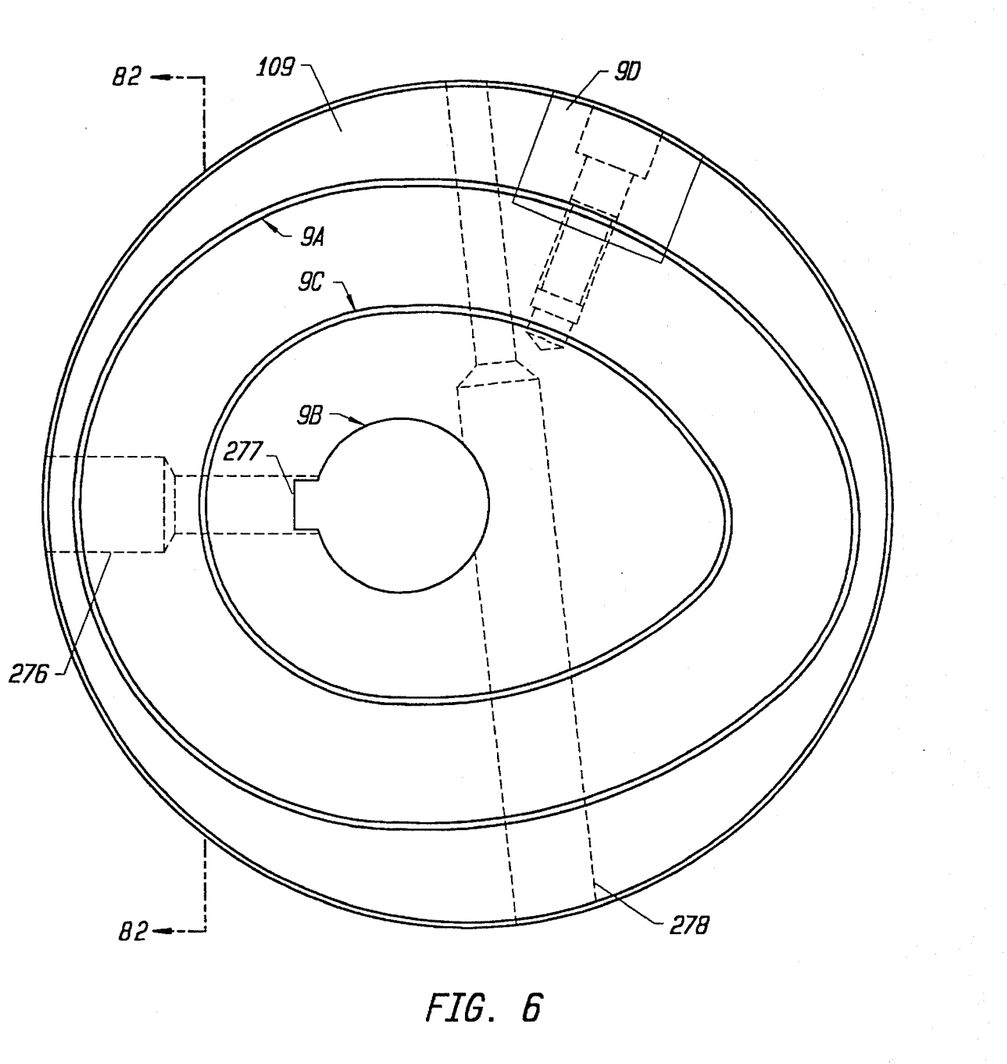
FIG. 6 is a cross-sectional view (in the plane of FIG. 4) of box cam 109 of the FIG. 4 assembly.
Figure 7:
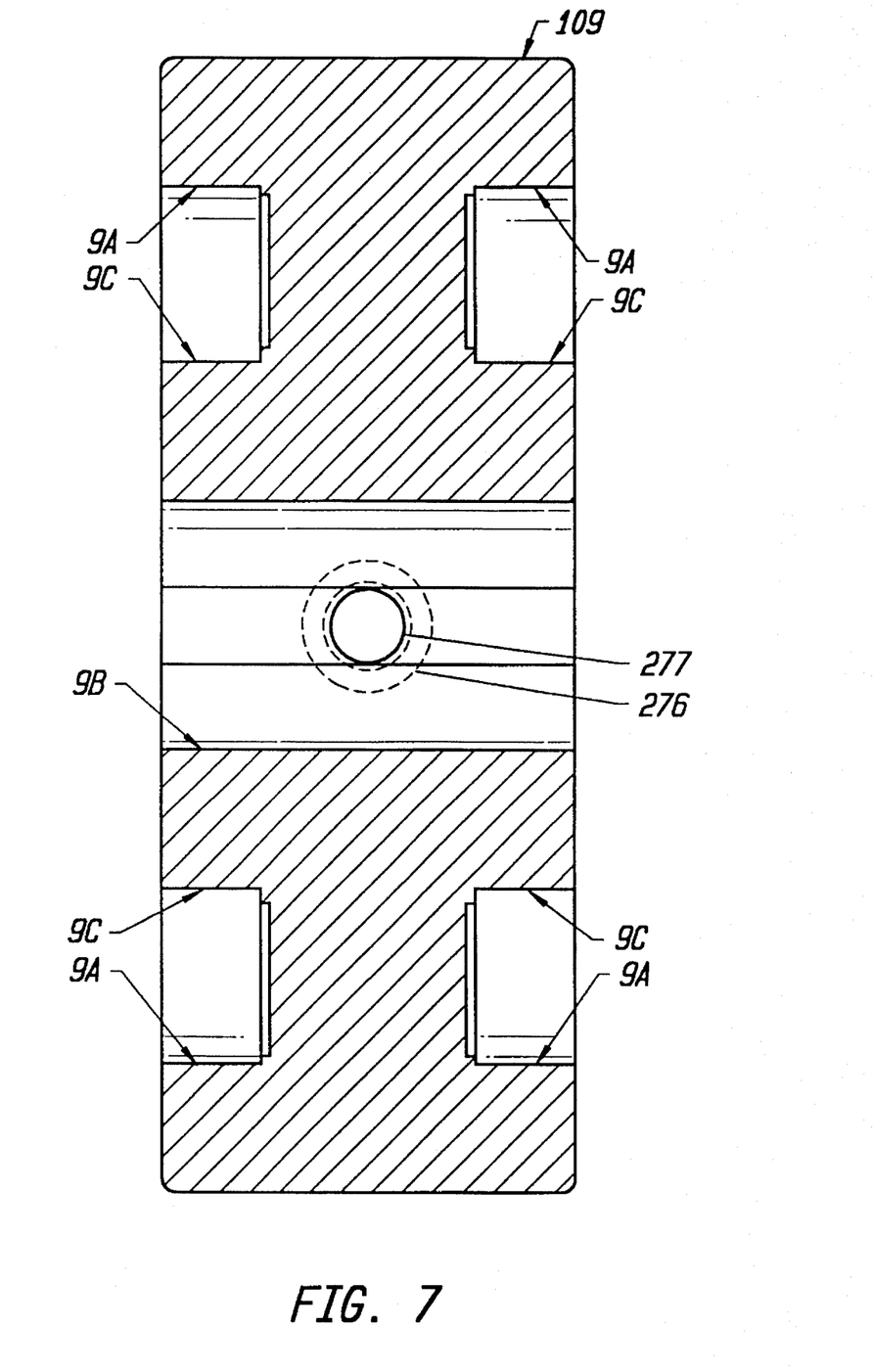
FIG. 7 is a cross-sectional view of box cam 109 of FIG. 6, taken along line C—C of FIG. 6.

Box cam 109 has a groove (a recessed portion) in each of its side faces (in each of the left and right faces of cam 109 as shown in FIG. 7). Each groove defines an outer cam surface 9A and an inner cam surface 9C opposed to the outer cam surface (as shown in FIG. 7). Cam surfaces 9A and 9C of one side face of cam 109 define an oblong, closed first cam track (as shown in each of FIGS. 4 and 6). Cam surfaces 9A and 9C of the other face of cam 109 define an oblong, closed second cam track which is a mirror image of the first cam track.

One cam follower 140 (shown in FIGS. 4, 5, 8, and 9) attached to arm 133A of rocker arm unit 133 between the fixed end of unit 133 (the end attached to pin 112) and the free end of unit 133 (the left end in FIG. 5) rides between cam surfaces 9A and 9C of the first cam track. Another cam follower 140 (shown in FIGS. 4, 5, 8, and 9) attached to arm 133B of rocker arm unit 133 between the fixed end of unit 133 (the end attached to pin 112) and the free end of unit 133 (the left end in FIG. 5) rides between cam surfaces 9A and 9C of the second cam track. The first and second cam tracks are aligned, so that one cam follower 140 is always directly below (into the plane of FIG. 4) the other cam follower 140 when the knife assembly is viewed from the viewpoint of FIG. 4.

Box cam 109 has a removable insert portion 9D, which defines part of outer cam surfaces 9A when installed as shown in FIG. 6. Insert portion 9D is removed (from the rest of cam 109) to allow assembly of rocker arm unit 133 with box cam 109 (so that cam followers 140 ride properly between cam surfaces 9A and 9C of each cam track of cam 109). After cam 109 and unit 133 have been assembled together, insert 9D is reinstalled back to its position shown in FIG. 6.

A cam follower 23 protrudes from each of shafts 15 into engagement with unit 133 (near unit 133's free end) as shown in FIGS. 4 and 5.

Since each cam follower 140 always rides between an upper and a lower cam surface of cam 109 (regardless of the rotational orientation of shaft 21 and cam 109), cam 109 exerts an upward force on cam followers 140 (and thus on unit 133) during some portions of the rotational cycle of cam 109 and cam 109 exerts a downward force on cam followers 140 (and thus on unit 133) during the other portions of cam 109's rotational cycle. In particular, when the large radius portion of the aligned cam tracks (the cam track portion along which inner cam surfaces 9C are radially farthest from the central longitudinal axis of shaft 21) engages cam followers 140, cam 109 pushes followers 140 down, thus pivoting arm unit 133 counterclockwise about pin 112 (in the plane of FIG. 4), which causes arm unit 133 to force cam followers 23 downward, which in turn translates shafts 15 longitudinally downward relative to the carriage. Then, when continuing rotation of shaft 21 rotates the small radius portion of the aligned cam tracks (the cam track portion along which inner cam surfaces 9C are radially nearest to the central longitudinal axis of shaft 21) engages cam followers 140, cam 109 pushes followers 140 up, thus pivoting arm unit 133 clockwise about pin 112 (in the plane of FIG. 4), which causes arm unit 133 to force cam followers 23 upward, which in turn translates shafts 15 longitudinally upward relative to the carriage.

The term "box cam" is used throughout the specification (including in the claims) to denote a cam that includes at least one cam track capable of causing a cam follower engaged therewith to execute reciprocating motion as the box cam rotates. The term "reciprocating motion" denotes cyclical motion including motion in a first direction (at one moment of the cycle) and motion in the direction opposite the first direction (at another moment of the cycle). Thus, cam 9 of FIGS. 2 and 3 is not a box cam since cam 9 can drive cam follower 40 downward but not upward (when viewed as in FIG. 3) during a complete rotation of cam 9 about the axis of shaft 21. Rather, an externally supplied spring force (due to springs 126) is required to drive cam follower 40 of FIGS. 2 and 3 upward (when viewed as in FIG. 3).

Figure 8:
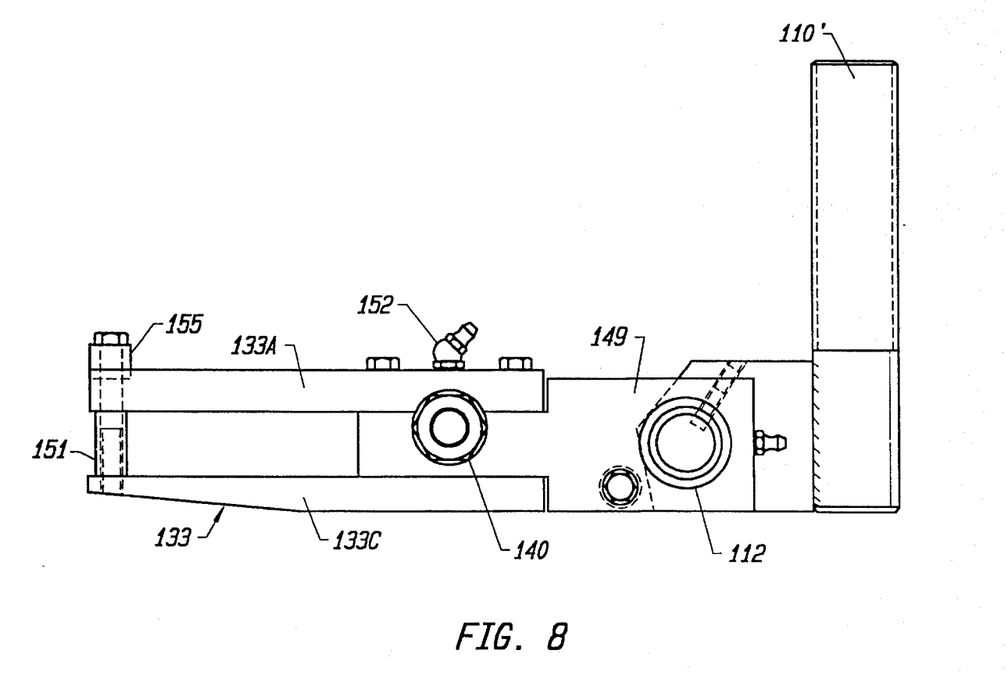
FIG. 8 is a side elevational of rocker arm unit 133 of the FIG. 4 assembly.
Figure 9:
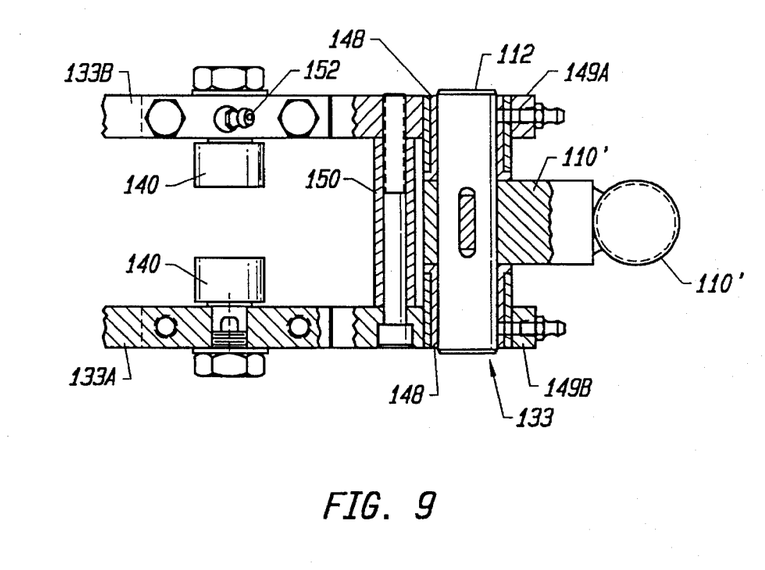
FIG. 9 is a top view of rocker arm unit 133 of FIG. 8.

Details of rocker arm unit 133 are best shown in FIGS. 8 and 9. Unit 133 includes member 149 (shown in FIG. 8). Pin 112 is pivotally attached to member 149 at one end of unit 133 (the right end of unit 133 in FIG. 8). Member 149 consists of portions 149A and 149B (shown in FIG. 9). Pin 112 is fixedly attached to stroke adjustment screw 110'. To attach unit 133 to pin 112, bearing 148 is installed around pin 112, portions 149A and 149B are then fitted around bearing 148 and pin 112, and portions 149A and 149B are then locked together. The remaining portion of unit 133 is fixedly attached to portions 149A and 149B (away from bearing 148). When so installed, unit 133 has freedom to pivot relative to pin 112 and screw 110' about the axis of pin 112 (with bearing 148 functioning to bear the load exerted by pivoting unit 133 on fixed pin 112 and to reduce friction between pivoting unit 133 and fixed pin 112).

Unit 133 also includes upper arms 133A and 133B (shown in FIGS. 5 and 9) and lower arms 133C (there are two arms 133C, only one of which is shown in FIGS. 4 and 8). One end of each of upper arms 133A and 133B and lower arms 133C is fixedly attached to portions 149A and 149B of member 149, and spacer 150 is connected between arms 133A and 133B. Tie bar 155 and spacers 151 are connected between the other ends (the "free" ends) of arms 133A, 133B, and 133C, with bar 155 connected between the free ends of arms 133A and 133B (as best shown in FIG. 5), one spacer 151 connected between the free ends of arm 133A and the arm 133C below arm 133A, and the other spacer 151 connected between the free ends of arm 133B and the arm 133C below arm 133B.

FIG. 9 shows a top view of arm 133B, and a cross-sectional view of arm 133A. A cam follower 140 is rotatably attached to each of arms 133A and 133B (as best shown in FIG. 9). Preferably, each cam follower 104 includes a roller (for engaging cam tracks of box cam 109) rotatably mounted to a threaded shaft. To mount the cam follower to arm 133A or 133B, the shaft is inserted through a hole in the arm and a nut is threaded onto the shaft to retain the cam follower in place. Preferably, a grease fitting 152 is provided at the location of each cam follower, to enable lubrication of the cam followers.

In operation of the inventive knife assembly, cam followers ride in the cam tracks of box cam 109, thus forcing unit 133 to pivot relative to fixed pin 112 and screw 110'. As unit 133 pivots (clockwise or counterclockwise with respect to the central axis of pin 112), unit 133 drives shafts 15 longitudinally up or down, as follows. A cam follower 23 protrudes from one shaft 15 into the space between arm 133A and arm 133C below arm 133A, and another cam follower 23 protrudes from the other shaft 15 into the space between arm 133B and arm 133C below arm 133B. Thus, cam followers 23 engage arms 133A, 133B, and 133C, and these arms force cam followers 23 up and down as they pivot with the rest of unit 133.

As unit 133 undergoes reciprocating pivoting motion in response to rotating box cam 109, the entire carriage assembly (including shafts 10, 15, and 114 and plates 7 and 132) undergoes rocking motion in response to rotating eccentric 42'. More specifically, eccentric 42' is attached (at a bearing) to shaft member 114', with eccentric 42' having freedom to rotate relative to member 114'. As eccentric 42' rotates with shaft 21, eccentric 42' exerts force on member 114' which causes member 114' to undergo reciprocating motion as follows: the center of gravity of member 114' translates back and forth along an arc of a circle in the plane of FIG. 4, but member 114' does not rotate (about its center of gravity) in the plane of FIG. 4. This rocking motion of the carriage imparts a rocking component to the motion of shafts 15 (perpendicular to the longitudinal axes of shafts 15), which enables shafts 15 to translate knives 101 and 102 so as to follow translating specimens of fruit during periods when cam 109 is forcing shafts 15 (and thus knives 101 and 102) longitudinally downward into engagement with the fruit.

More generally, the invention is a pitting knife drive assembly, which can be mounted in a fruit pitting apparatus (e.g., a pitting apparatus of the type shown in FIG. 1) to drive pitting knives of the pitting apparatus. The inventive pitting knife assembly includes a box cam (e.g., box cam 109 of FIGS. 4–7), means for rotating the box cam (e.g., drive shaft 21 and motor 20), a pivot unit which undergoes reciprocating pivoting motion in response to the rotating box cam (e.g., rocker arm unit 133 of FIGS. 4, 5, 8, and 9), and a set of one or more shafts to which pitting knives can be mounted (e.g., shafts 15 to which knives 101 and 102 can be mounted) which reciprocate longitudinally (in directions parallel to their longitudinal axes) in response to the reciprocating pivoting motion of the pivot unit. Preferably also, the pitting knife assembly includes a subassembly (e.g., shaft 114' and eccentric 42' and the carriage comprising arms 2', plates 7 and 132, and shafts 8 and 30 of FIGS. 4 and 5) for causing the shafts to undergo reciprocating motion in directions perpendicular to their longitudinal axes. A preferred implementation of the latter subassembly includes a carriage driven by a rotating eccentric (e.g., eccentric 42'), where the eccentric and the box cam are mounted along a common drive shaft, and the means for rotating the box cam include a motor for rotating the drive shaft (thereby rotating both the box cam and the eccentric).

Figure 10:
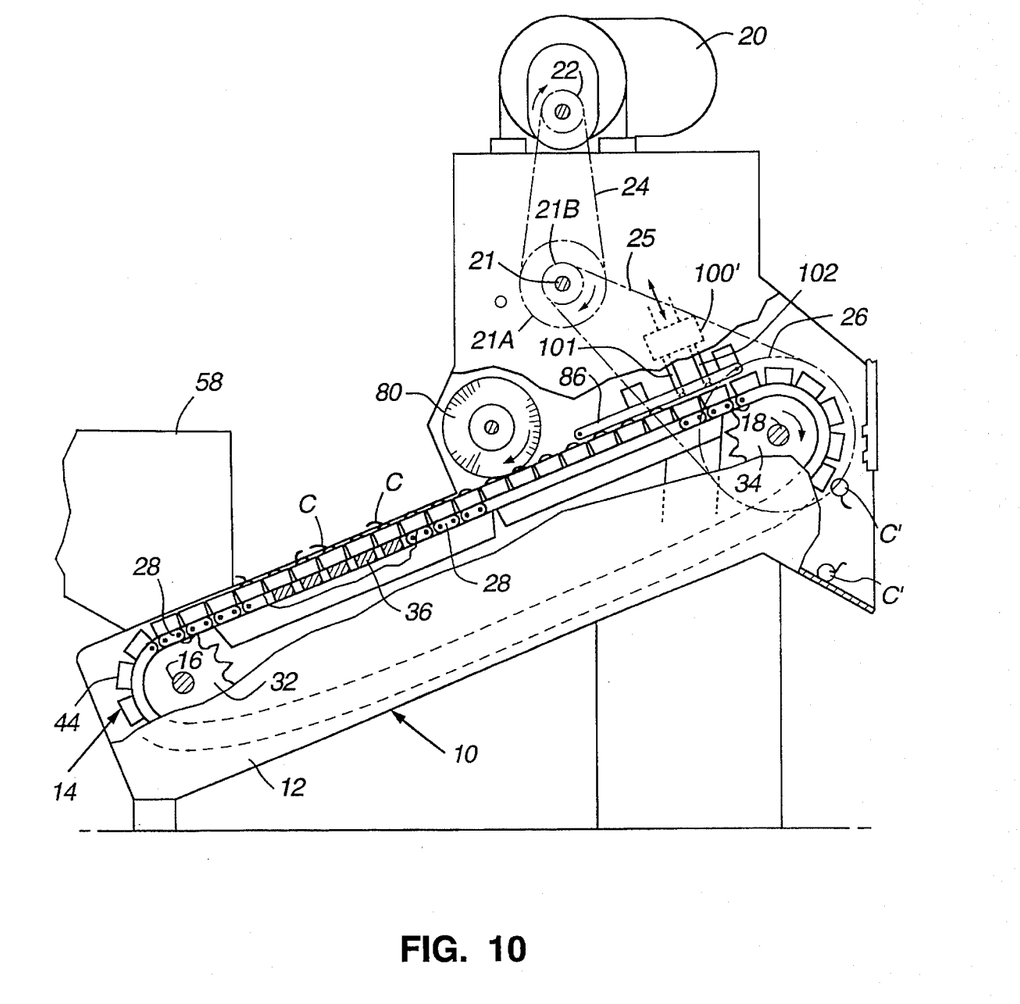
FIG. 10 is a side cross-sectional view of a pitting apparatus which embodies the invention.

In another class of embodiments, the invention is an apparatus for pitting fruit (e.g., cherries) which includes a pitting knife drive assembly of the type described in the previous paragraph, pitting knives attached to said drive assembly, and a conveyor subassembly for translating the fruit past the pitting knife assembly. An example of such fruit pitting apparatus is that shown in FIG. 10. The apparatus of FIG. 10 is identical to that described above with reference to FIG. 1 (and the description thereof set forth above will not be repeated), except in the following two respects. First, the FIG. 10 apparatus includes the inventive knife assembly 100' for driving knives 101 and 102 (e.g., the pitting knife assembly described with reference to FIGS. 4 and 5) rather than a conventional knife assembly 100 (of the type described with reference to FIGS. 2 and 3). Second, in a preferred implementation of the pitting apparatus of FIG. 10, conveyor 14 is implemented as an elastomeric timing belt rather than as a metal chain looped around sprockets 32 and 34. Use of such a timing belt in such preferred implementation eliminates problems due to chain stretch and eliminates the need to lubricate a metal conveyor chain.

The foregoing is merely illustrative and explanatory of preferred embodiments of the inventive apparatus. Various changes in the component sizes and shapes, and other details of the embodiments described herein may be within the scope of the appended claims.

What is claimed is:

1. A pitting knife drive assembly for driving pitting knives of a fruit pitting apparatus, said pitting knife drive assembly including:

a box cam;

a means for rotating the box cam;

a pivot unit engaged with the box cam so that the pivot unit undergoes reciprocating pivoting motion in response to rotation of the box cam; and a set of one or more pitting knife mounting shafts, wherein each of the pitting knife mounting shafts has a longitudinal axis and is engaged with the pivot unit so as to reciprocate longitudinally in response to the reciprocating pivoting motion of the pivot unit.

2. The assembly of claim 1, wherein the means for rotating the box cam includes:

a drive shaft to which the box cam is fixedly attached; and means for rotating the drive shaft.

3. The assembly of claim 1, also including:

a subassembly for causing each of the pitting knife mounting shafts to undergo reciprocating motion in directions perpendicular to the longitudinal axis thereof, while said each of the pitting knife mounting shafts reciprocates longitudinally in response to the reciprocating pivoting motion of the pivot unit.

4. The assembly of claim 3, wherein the means for rotating the box cam includes:

a drive shaft to which the box cam is fixedly attached; and means for rotating the drive shaft.

5. The assembly of claim 4, wherein the subassembly includes:

an eccentric fixedly attached to the drive shaft; and a carriage, engaged with the eccentric and slidably attached to each of the pitting knife mounting shafts.

6. The assembly of claim 1, wherein the box cam has a channel extending therethrough for receiving a drive shaft, the box cam has a side face surrounding a first end of the channel and a second side face surrounding a second end of the channel, each said side face has a recessed portion, and each said recessed portion defines an outer cam surface and an inner cam surface.

7. The assembly of claim 6, wherein the inner cam surface of the side face and the outer cam surface of the side face define a first closed cam track around the first end of the channel, and wherein the inner cam surface of the second side face and the outer cam surface of the second side face define a second closed cam track around the second end of the channel.

8. The assembly of claim 7, wherein each of the first closed cam track and the second closed cam track is an oblong cam track, and the first closed cam track is a mirror image of the second closed cam track.

9. A fruit pitting apparatus, comprising:

a conveyor assembly for translating specimens of fruit past a pitting station;

a knife drive assembly mounted at the pitting station, wherein the knife drive assembly includes at least one pitting knife mounting shaft; and a set of pitting knives mounted to said at least one pitting knife mounting shaft, wherein the knife drive assembly also includes:

a box cam;

a means for rotating the box cam; and a pivot unit engaged with the box cam so that the pivot unit undergoes reciprocating pivoting motion in response to rotation of the box cam, wherein each said pitting knife mounting shaft has a longitudinal axis and is engaged with the pivot unit so as to reciprocate longitudinally in response to the reciprocating pivoting motion of the pivot unit.

10. The apparatus of claim 9, wherein the conveyor assembly is dimensioned for translating cherries past the pitting station, each of the pitting knives is sized and shaped for pitting one of said cherries, and the means for rotating the box cam includes:

a drive shaft to which the box cam is fixedly attached; and means for rotating the drive shaft.

11. The apparatus of claim 9, wherein the knife drive assembly also includes:

a subassembly for causing each said pitting knife mounting shaft to undergo reciprocating motion in directions perpendicular to the longitudinal axis thereof while said pitting knife mounting shaft reciprocates longitudinally in response to the reciprocating pivoting motion of the pivot unit.

12. The apparatus of claim 11, wherein the means for rotating the box cam includes:

a drive shaft to which the box cam is fixedly attached; and means for rotating the drive shaft.

13. The apparatus of claim 12, wherein the subassembly includes:

an eccentric fixedly attached to the drive shaft; and a carriage, engaged with the eccentric and slidably attached to each said pitting knife mounting shaft.

14. The apparatus of claim 9, wherein the box cam has a channel extending therethrough for receiving a drive shaft, the box cam has a side face surrounding a first end of the channel and a second side face surrounding a second end of the channel, each said side face has a recessed portion, and each said recessed portion defines an outer cam surface and an inner cam surface.

15. The apparatus of claim 14, wherein the inner cam surface of the side face and the outer cam surface of the side face define a first closed cam track around the first end of the channel, and wherein the inner cam surface of the second side face and the outer cam surface of the second side face define a second closed cam track around the second end of the channel.

16. The apparatus of claim 15, wherein each of the first closed cam track and the second closed cam track is an oblong cam track, and the first closed cam track is a mirror image of the second closed cam track.

* * * * *

UNITED STATES PATENT AND TRADEMARK OFFICE
CERTIFICATE OF CORRECTION

PATENT NO. : 5,619,912
DATED : April 15, 1997
INVENTOR(S) : Klaus Silbermann

It is certified that error appears in the above-indentified patent and that said Letters Patent is hereby corrected as shown below:

In column 4, line 67, "A-A" should be replaced by --80-80--.

In column 5, line 6, "B-B" should be replaced by --81-81--.

In column 5, line 10, "C-C" should be replaced by --82-82--.

In column 5, line 45, "B-B" should be replaced by --81-81--.

In column 6, line 14, "77" should be --76--.

In column 6, line 21, "set screw" should be --key--.

In column 6, line 23, "key" should be --set screw--.

In column 6, line 24, "screw" should be --key--.

In column 6, line 25, "key" should be --screw--.

In column 6, line 25, "screw" should be --key--.

In column 6, line 26, "channel 21" should be replaced by --shaft 21--.

Signed and Sealed this

Twelfth Day of August, 1997

Attest:

BRUCE LEHMAN

Attesting Officer

Commissioner of Patents and Trademarks